(12) United States Patent
Shimamura et al.

(10) Patent No.: US 10,884,807 B2
(45) Date of Patent: Jan. 5, 2021

(54) SERVERLESS COMPUTING AND TASK SCHEDULING

(71) Applicant: CISCO TECHNOLOGY, INC., San Jose, CA (US)

(72) Inventors: Komei Shimamura, London (GB); Timothy Okwii, London (GB); Debojyoti Dutta, Santa Clara, CA (US); Yathiraj B. Udupi, San Jose, CA (US); Rahul Ramakrishna, San Jose, CA (US); Xinyuan Huang, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 393 days.

(21) Appl. No.: 15/485,910

(22) Filed: Apr. 12, 2017

(65) Prior Publication Data
US 2018/0300173 A1 Oct. 18, 2018

(51) Int. Cl.
*G06F 9/50* (2006.01)
(52) U.S. Cl.
CPC .......... *G06F 9/5027* (2013.01); *G06F 9/5066* (2013.01)
(58) Field of Classification Search
None
See application file for complete search history.

(56) References Cited

U.S. PATENT DOCUMENTS

| | | |
|---|---|---|
| 3,629,512 A | 12/1971 | Yuan |
| 4,769,811 A | 9/1988 | Eckberg, Jr. et al. |
| 5,408,231 A | 4/1995 | Bowdon |
| 5,491,690 A | 2/1996 | Alfonsi et al. |
| 5,557,609 A | 9/1996 | Shobatake et al. |
| 5,600,638 A | 2/1997 | Bertin et al. |
| 5,687,167 A | 11/1997 | Bertin et al. |
| 6,115,384 A | 9/2000 | Parzych |
| 6,167,438 A | 12/2000 | Yates et al. |
| 6,400,681 B1 | 6/2002 | Bertin et al. |

(Continued)

FOREIGN PATENT DOCUMENTS

| | | |
|---|---|---|
| CN | 102073546 A | 7/2013 |
| EP | 3160073 | 4/2017 |

(Continued)

OTHER PUBLICATIONS

Author Unknown, "Xilinx Demonstrates Reconfigurable Acceleration for Cloud Scale Applications at SC16," PR Newswire, Nov. 7, 2016, 9 pages; news.sys-con.com/node/3948204.

(Continued)

*Primary Examiner* — Eric C Wai
(74) *Attorney, Agent, or Firm* — Polsinelli PC

(57) ABSTRACT

In one embodiment, a method for serverless computing comprises: receiving a task definition, wherein the task definition comprises a first task and a second task chained to the first task; adding the first task and the second task to a task queue; executing the first task from the task queue using hardware computing resources in a first serverless environment associated with a first serverless environment provider; and executing the second task from the task queue using hardware computing resources in a second serverless environment selected based on a condition on an output of the first task.

14 Claims, 7 Drawing Sheets

(56) References Cited

U.S. PATENT DOCUMENTS

| | | |
|---|---|---|
| 6,493,804 B1 | 12/2002 | Soltis et al. |
| 6,661,797 B1 | 12/2003 | Goel et al. |
| 6,687,229 B1 | 2/2004 | Kataria et al. |
| 6,799,270 B1 | 9/2004 | Bull et al. |
| 6,888,828 B1 | 5/2005 | Partanen et al. |
| 6,993,593 B2 | 1/2006 | Iwata |
| 7,027,408 B2 | 4/2006 | Nabkel et al. |
| 7,062,567 B2 | 6/2006 | Benitez et al. |
| 7,095,715 B2 | 8/2006 | Buckman et al. |
| 7,096,212 B2 | 8/2006 | Tribble et al. |
| 7,139,239 B2 | 11/2006 | McFarland et al. |
| 7,165,107 B2 | 1/2007 | Pouyoul et al. |
| 7,197,008 B1 | 3/2007 | Shabtay et al. |
| 7,197,660 B1 | 3/2007 | Liu et al. |
| 7,209,435 B1 | 4/2007 | Kuo et al. |
| 7,227,872 B1 | 6/2007 | Biswas et al. |
| 7,231,462 B2 | 6/2007 | Berthaud et al. |
| 7,333,990 B1 | 2/2008 | Thiagarajan et al. |
| 7,443,796 B1 | 10/2008 | Albert et al. |
| 7,458,084 B2 | 11/2008 | Zhang et al. |
| 7,472,411 B2 | 12/2008 | Wing et al. |
| 7,486,622 B2 | 2/2009 | Regan et al. |
| 7,536,396 B2 | 5/2009 | Johnson et al. |
| 7,552,201 B2 | 6/2009 | Areddu et al. |
| 7,558,261 B2 | 7/2009 | Arregoces et al. |
| 7,567,504 B2 | 7/2009 | Darling et al. |
| 7,571,470 B2 | 8/2009 | Arregoces et al. |
| 7,573,879 B2 | 8/2009 | Narad et al. |
| 7,610,375 B2 | 10/2009 | Portolani et al. |
| 7,643,468 B1 | 1/2010 | Arregoces et al. |
| 7,644,182 B1 | 1/2010 | Banerjee et al. |
| 7,647,422 B2 | 1/2010 | Singh et al. |
| 7,657,940 B2 | 2/2010 | Portolani et al. |
| 7,668,116 B2 | 2/2010 | Wijnands et al. |
| 7,684,321 B2 | 3/2010 | Muirhead et al. |
| 7,738,469 B1 | 6/2010 | Shekokar et al. |
| 7,751,409 B1 | 7/2010 | Carolan |
| 7,793,157 B2 | 9/2010 | Bailey et al. |
| 7,814,284 B1 | 10/2010 | Glass et al. |
| 7,831,693 B2 | 11/2010 | Lai |
| 7,860,095 B2 | 12/2010 | Forissier et al. |
| 7,860,100 B2 | 12/2010 | Khalid et al. |
| 7,895,425 B2 | 2/2011 | Khalid et al. |
| 7,899,012 B2 | 3/2011 | Ho et al. |
| 7,899,861 B2 | 3/2011 | Feblowitz et al. |
| 7,907,595 B2 | 3/2011 | Khanna et al. |
| 7,908,480 B2 | 3/2011 | Firestone et al. |
| 7,983,174 B1 | 7/2011 | Monaghan et al. |
| 7,990,847 B1 | 8/2011 | Leroy et al. |
| 8,000,329 B2 | 8/2011 | Fendick et al. |
| 8,018,938 B1 | 9/2011 | Fromm et al. |
| 8,094,575 B1 | 1/2012 | Vadlakonda et al. |
| 8,166,465 B2 | 4/2012 | Feblowitz et al. |
| 8,180,909 B2 | 5/2012 | Hartman et al. |
| 8,191,119 B2 | 5/2012 | Wing et al. |
| 8,195,774 B2 | 6/2012 | Lambeth et al. |
| 8,280,354 B2 | 10/2012 | Smith et al. |
| 8,281,302 B2 | 10/2012 | Durazzo et al. |
| 8,291,108 B2 | 10/2012 | Raja et al. |
| 8,305,900 B2 | 11/2012 | Bianconi |
| 8,311,045 B2 | 11/2012 | Quinn et al. |
| 8,316,457 B1 | 11/2012 | Paczkowski et al. |
| 8,355,332 B2 | 1/2013 | Beaudette et al. |
| 8,442,043 B2 | 5/2013 | Sharma et al. |
| 8,464,336 B2 | 6/2013 | Wei et al. |
| 8,479,298 B2 | 7/2013 | Keith et al. |
| 8,498,414 B2 | 7/2013 | Rossi |
| 8,520,672 B2 | 8/2013 | Guichard et al. |
| 8,601,152 B1 | 12/2013 | Chou |
| 8,612,612 B1 | 12/2013 | Dukes et al. |
| 8,627,328 B2 | 1/2014 | Mousseau et al. |
| 8,676,965 B2 | 3/2014 | Gueta |
| 8,676,980 B2 | 3/2014 | Kreeger et al. |
| 8,700,892 B2 | 4/2014 | Bollay et al. |
| 8,730,980 B2 | 5/2014 | Bagepalli et al. |
| 8,743,885 B2 | 6/2014 | Khan et al. |
| 8,751,420 B2 | 6/2014 | Hjelm et al. |
| 8,762,534 B1 | 6/2014 | Hong et al. |
| 8,762,707 B2 | 6/2014 | Killian et al. |
| 8,792,490 B2 | 7/2014 | Jabr et al. |
| 8,793,400 B2 | 7/2014 | Mcdysan et al. |
| 8,819,419 B2 | 8/2014 | Carlson et al. |
| 8,825,070 B2 | 9/2014 | Akhtar et al. |
| 8,830,834 B2 | 9/2014 | Sharma et al. |
| 8,904,037 B2 | 12/2014 | Haggar et al. |
| 8,949,847 B2 | 2/2015 | Kim et al. |
| 8,984,284 B2 | 3/2015 | Purdy, Sr. et al. |
| 9,001,827 B2 | 4/2015 | Appenzeller |
| 9,071,533 B2 | 6/2015 | Hui et al. |
| 9,077,661 B2 | 7/2015 | Andreasen et al. |
| 9,088,584 B2 | 7/2015 | Feng et al. |
| 9,130,872 B2 | 9/2015 | Kumar et al. |
| 9,143,438 B2 | 9/2015 | Khan et al. |
| 9,160,797 B2 | 10/2015 | Mcdysan |
| 9,178,812 B2 | 11/2015 | Guichard et al. |
| 9,253,274 B2 | 2/2016 | Quinn et al. |
| 9,300,585 B2 | 3/2016 | Kumar et al. |
| 9,338,097 B2 | 5/2016 | Anand et al. |
| 9,344,337 B2 | 5/2016 | Kumar et al. |
| 9,374,297 B2 | 6/2016 | Bosch et al. |
| 9,379,931 B2 | 6/2016 | Bosch et al. |
| 9,385,950 B2 | 7/2016 | Quinn et al. |
| 9,398,486 B2 | 7/2016 | La Roche, Jr. et al. |
| 9,407,540 B2 | 8/2016 | Kumar et al. |
| 9,413,655 B2 | 8/2016 | Shatzkamer et al. |
| 9,436,443 B2 | 9/2016 | Chiosi et al. |
| 9,479,443 B2 | 10/2016 | Bosch et al. |
| 9,491,094 B2 | 11/2016 | Patwardhan et al. |
| 9,537,836 B2 | 1/2017 | Maller et al. |
| 9,558,029 B2 | 1/2017 | Behera et al. |
| 9,559,970 B2 | 1/2017 | Kumar et al. |
| 9,608,896 B2 | 3/2017 | Kumar et al. |
| 9,723,106 B2 | 8/2017 | Shen et al. |
| 9,794,379 B2 | 10/2017 | Kumar et al. |
| 10,387,179 B1 * | 8/2019 | Hildebrant .......... G06F 9/45533 |
| 2001/0023442 A1 | 9/2001 | Masters |
| 2002/0131362 A1 | 9/2002 | Callon |
| 2002/0156893 A1 | 10/2002 | Pouyoul et al. |
| 2002/0167935 A1 | 11/2002 | Nabkel et al. |
| 2003/0023879 A1 | 1/2003 | Wray |
| 2003/0037070 A1 | 2/2003 | Marston |
| 2003/0088698 A1 | 5/2003 | Singh et al. |
| 2003/0110081 A1 | 6/2003 | Tosaki et al. |
| 2003/0120816 A1 | 6/2003 | Berthaud et al. |
| 2003/0226142 A1 | 12/2003 | Rand |
| 2004/0109412 A1 | 6/2004 | Hansson et al. |
| 2004/0148391 A1 | 7/2004 | Lake, Sr. et al. |
| 2004/0199812 A1 | 10/2004 | Earl |
| 2004/0213160 A1 | 10/2004 | Regan et al. |
| 2004/0264481 A1 | 12/2004 | Darling et al. |
| 2004/0268357 A1 | 12/2004 | Joy et al. |
| 2005/0044197 A1 | 2/2005 | Lai |
| 2005/0058118 A1 | 3/2005 | Davis |
| 2005/0060572 A1 | 3/2005 | Kung |
| 2005/0086367 A1 | 4/2005 | Conta et al. |
| 2005/0120101 A1 | 6/2005 | Nocera |
| 2005/0152378 A1 | 7/2005 | Bango et al. |
| 2005/0157645 A1 | 7/2005 | Rabie et al. |
| 2005/0160180 A1 | 7/2005 | Rabje et al. |
| 2005/0204042 A1 | 9/2005 | Banerjee et al. |
| 2005/0210096 A1 | 9/2005 | Bishop et al. |
| 2005/0257002 A1 | 11/2005 | Nguyen |
| 2005/0281257 A1 | 12/2005 | Yazaki et al. |
| 2005/0286540 A1 | 12/2005 | Hurtta et al. |
| 2005/0289244 A1 | 12/2005 | Sahu et al. |
| 2006/0005240 A1 | 1/2006 | Sundarrajan et al. |
| 2006/0045024 A1 | 3/2006 | Previdi et al. |
| 2006/0074502 A1 | 4/2006 | McFarland |
| 2006/0092950 A1 | 5/2006 | Arregoces et al. |
| 2006/0095960 A1 | 5/2006 | Arregoces et al. |
| 2006/0112400 A1 | 5/2006 | Zhang et al. |
| 2006/0168223 A1 | 7/2006 | Mishra et al. |
| 2006/0233106 A1 | 10/2006 | Achlioptas et al. |
| 2006/0233155 A1 | 10/2006 | Srivastava |

(56) References Cited

U.S. PATENT DOCUMENTS

| | | |
|---|---|---|
| 2007/0061441 A1 | 3/2007 | Landis et al. |
| 2007/0067435 A1 | 3/2007 | Landis et al. |
| 2007/0143851 A1 | 6/2007 | Nicodemus et al. |
| 2007/0237147 A1 | 10/2007 | Quinn et al. |
| 2007/0250836 A1 | 10/2007 | Li et al. |
| 2008/0080509 A1 | 4/2008 | Khanna et al. |
| 2008/0080517 A1 | 4/2008 | Roy et al. |
| 2008/0170542 A1 | 7/2008 | Hu |
| 2008/0177896 A1 | 7/2008 | Quinn et al. |
| 2008/0181118 A1 | 7/2008 | Sharma et al. |
| 2008/0196083 A1 | 8/2008 | Parks et al. |
| 2008/0209039 A1 | 8/2008 | Tracey et al. |
| 2008/0219287 A1 | 9/2008 | Krueger et al. |
| 2008/0225710 A1 | 9/2008 | Raja et al. |
| 2008/0291910 A1 | 11/2008 | Tadimeti et al. |
| 2009/0003364 A1 | 1/2009 | Fendick et al. |
| 2009/0006152 A1 | 1/2009 | Timmerman et al. |
| 2009/0094684 A1 | 4/2009 | Chinnusamy et al. |
| 2009/0204612 A1 | 8/2009 | Keshavarz-nia et al. |
| 2009/0300207 A1 | 12/2009 | Giaretta et al. |
| 2009/0305699 A1 | 12/2009 | Deshpande et al. |
| 2009/0328054 A1 | 12/2009 | Paramasivam et al. |
| 2010/0063988 A1 | 3/2010 | Khalid |
| 2010/0080226 A1 | 4/2010 | Khalid |
| 2010/0191612 A1 | 7/2010 | Raleigh |
| 2011/0023090 A1 | 1/2011 | Asati et al. |
| 2011/0137991 A1 | 6/2011 | Russell |
| 2011/0142056 A1 | 6/2011 | Manoj |
| 2011/0222412 A1 | 9/2011 | Kompella |
| 2011/0255538 A1 | 10/2011 | Srinivasan et al. |
| 2012/0131662 A1 | 5/2012 | Kuik et al. |
| 2012/0147894 A1 | 6/2012 | Mulligan et al. |
| 2012/0324442 A1 | 12/2012 | Barde |
| 2013/0003735 A1 | 1/2013 | Chao et al. |
| 2013/0044636 A1 | 2/2013 | Koponen et al. |
| 2013/0121137 A1 | 5/2013 | Feng et al. |
| 2013/0124708 A1 | 5/2013 | Lee et al. |
| 2013/0163594 A1 | 6/2013 | Sharma et al. |
| 2013/0163606 A1 | 6/2013 | Bagepalli et al. |
| 2013/0272305 A1 | 10/2013 | Lefebvre et al. |
| 2013/0311675 A1 | 11/2013 | Kancherla Mani Prasad |
| 2013/0329584 A1 | 12/2013 | Ghose et al. |
| 2014/0036730 A1 | 2/2014 | Nellikar Suraj et al. |
| 2014/0105062 A1 | 4/2014 | McDysan et al. |
| 2014/0254603 A1 | 9/2014 | Banavalikar et al. |
| 2014/0279863 A1 | 9/2014 | Krishnamurthy et al. |
| 2014/0280836 A1 | 9/2014 | Kumar et al. |
| 2014/0321459 A1 | 10/2014 | Kumar et al. |
| 2014/0334295 A1 | 11/2014 | Guichard et al. |
| 2014/0362862 A1 | 12/2014 | Guichard et al. |
| 2014/0369209 A1 | 12/2014 | Khurshid et al. |
| 2014/0376558 A1 | 12/2014 | Rao et al. |
| 2015/0012584 A1 | 1/2015 | Lo et al. |
| 2015/0012988 A1 | 1/2015 | Jeng et al. |
| 2015/0029871 A1 | 1/2015 | Frost et al. |
| 2015/0032871 A1 | 1/2015 | Allan et al. |
| 2015/0052516 A1 | 2/2015 | French et al. |
| 2015/0074276 A1 | 3/2015 | DeCusatis et al. |
| 2015/0082308 A1 | 3/2015 | Kiess et al. |
| 2015/0085870 A1 | 3/2015 | Narasimha et al. |
| 2015/0092564 A1 | 4/2015 | Aldrin |
| 2015/0103827 A1 | 4/2015 | Quinn et al. |
| 2015/0131484 A1 | 5/2015 | Aldrin |
| 2015/0195197 A1 | 7/2015 | Yong et al. |
| 2015/0222516 A1 | 8/2015 | Deval et al. |
| 2015/0222533 A1 | 8/2015 | Birrittella et al. |
| 2015/0319078 A1 | 11/2015 | Lee et al. |
| 2015/0326473 A1 | 11/2015 | Dunbar et al. |
| 2015/0365495 A1 | 12/2015 | Fan et al. |
| 2015/0381465 A1 | 12/2015 | Narayanan et al. |
| 2015/0381557 A1 | 12/2015 | Fan et al. |
| 2016/0028604 A1 | 1/2016 | Chakrabarti et al. |
| 2016/0028640 A1 | 1/2016 | Zhang et al. |
| 2016/0050132 A1 | 2/2016 | Zhang |
| 2016/0080263 A1 | 3/2016 | Park et al. |
| 2016/0099853 A1 | 4/2016 | Nedeltchev et al. |
| 2016/0103695 A1* | 4/2016 | Udupi ............... H04L 47/78 718/1 |
| 2016/0112502 A1 | 4/2016 | Clarke et al. |
| 2016/0119253 A1 | 4/2016 | Kang et al. |
| 2016/0127139 A1 | 5/2016 | Tian et al. |
| 2016/0165014 A1 | 6/2016 | Nainar et al. |
| 2016/0173464 A1 | 6/2016 | Wang et al. |
| 2016/0179560 A1 | 6/2016 | Ganguli et al. |
| 2016/0182684 A1 | 6/2016 | Connor et al. |
| 2016/0212017 A1 | 7/2016 | Li et al. |
| 2016/0226742 A1 | 8/2016 | Apathotharanan et al. |
| 2016/0285720 A1 | 9/2016 | Mäenpää et al. |
| 2016/0328273 A1 | 11/2016 | Molka et al. |
| 2016/0352629 A1 | 12/2016 | Wang et al. |
| 2016/0380966 A1 | 12/2016 | Gunnalan et al. |
| 2017/0019303 A1 | 1/2017 | Swamy et al. |
| 2017/0031804 A1 | 2/2017 | Ciszewski et al. |
| 2017/0068574 A1* | 3/2017 | Cherkasova ........... G06F 9/5044 |
| 2017/0078175 A1 | 3/2017 | Xu et al. |
| 2017/0187609 A1 | 6/2017 | Lee et al. |
| 2017/0208000 A1 | 7/2017 | Bosch et al. |
| 2017/0214627 A1 | 7/2017 | Zhang et al. |
| 2017/0237656 A1 | 8/2017 | Gage et al. |
| 2017/0279712 A1 | 9/2017 | Nainar et al. |
| 2017/0310611 A1 | 10/2017 | Kumar et al. |
| 2017/0371703 A1* | 12/2017 | Wagner .................. G06F 9/485 |

FOREIGN PATENT DOCUMENTS

| | | |
|---|---|---|
| WO | WO 2011/029321 | 3/2011 |
| WO | WO 2012/056404 | 5/2012 |
| WO | WO 2015/180559 | 12/2015 |
| WO | WO 2015/187337 | 12/2015 |
| WO | WO 2016/004556 | 1/2016 |
| WO | WO 2016/058245 | 4/2016 |

OTHER PUBLICATIONS

Burt, Jeff, "Intel Begins Shipping Xeon Chips With FPGA Accelerators," eWeek, Apr. 13, 2016, 3 pages.

Chen, Yu-Ting, et al., "When Apache Spark Meets FPGAs: A Case Study for Next-Generation DNA Sequencing Acceleration," The 8th USENIX Workshop on Hot Topics in Cloud Computing, Jun. 20, 2016, 7 pages.

Fahmy Suhaib A., et al., "Virtualized FPGA Accelerators for Efficient Cloud Computing," The University of Warwick, Cloud Computing Technology and Science (CloudCom), IEEE 7th International Conference, Nov. 30, 2015, 7 pages.

Farrel, A., et al., "A Path Computation Element (PCE)—Based Architecture," RFC 4655, Network Working Group, Aug. 2006, 40 pages.

Hejtmanek, Lukas, "Scalable and Distributed Data Storage," is.muni.cz, Jan. 2005, pp. 1-58.

Jain, Abhishek Kumar, "Architecture Centric Coarse-Grained FPGA Overlays," Nanyang Technological University, Jan. 2017, 195 pages.

Kachris, Christoforos, et al., "A Survey on Reconfigurable Accelerators for Cloud Computing," Conference Paper, Aug. 2016, 11 pages.

Kidane Hiliwi Leake, et al., "NoC Based Virtualized FPGA as Cloud Services," 3rd International Conference on Embedded Systems in Telecommunications and Instrumentation (ICESTI'16), Oct. 24, 2016, 6 pages.

Neshatpour, Katayoun, et al., "Energy-Efficient Acceleration of Big Data Analytics Applications Using FPGAs," IEEE International Conference, Oct. 29, 2015, 9 pages.

Orellana, Julio Proano, et al., "FPGA-Aware Scheduling Strategies at Hypervisor Level in Cloud Environments," Hindawi Publishing Corporation, Scientific Programming, vol. 2016, Article ID 4670271, May 22, 2016, 13 pages.

Putnam, Andrew, et al., "A Reconfigurable Fabric for Accelerating Large-Scale Datacenter Services," Computer Architecture (ISCA), 41st International Symposium, Jun. 2014, 12 pages.

Weissman, Jon B. et al., "Optimizing Remote File Access for Parallel and Distributed Network 2017, Applications," users@cs.umn.edu, Oct. 19, 2017, pp. 1-25.

(56) References Cited

OTHER PUBLICATIONS

Westerbeek, Michiel, "Serverless Server-side Rendering with Redux-Saga," medium.com, Dec. 10, 2016, pp. 1-6.
Wikipedia contributors, "Serverless Computing," Wikipedia, The Free Encyclopedia, Jun. 11, 2017, 4 pages.
U.S. Appl. No. 15/485,948, filed Apr. 12, 2017 entitled "Virtualized Network Functions and Service Chaining in Serverless Computing Infrastructure," Inventors: Komei Shimamura, et al.
"AWS Lambda Developer Guide," Amazon Web Services Inc., Hämtad, May 2017, 416 pages.
"AWS Serverless Multi-Tier Architectures," Amazon Web Services Inc., Nov. 2015, 20 pages.
"Cisco NSH Service Chaining Configuration Guide," Cisco Systems, Inc., Jul. 28, 2017, 11 pages.
"Cloud Functions Overview," Cloud Functions Documentation, Mar. 21, 2017, 3 pages; cloud.google.com/functions/docs/concepts/overview.
"Cloud-Native VNF Modelling," Open Source Mano, © ETSI 2016, 18 pages.
Capdevila Pujol, P., "Deployment of NFV and SFC scenarios," EETAC, Master Thesis, Advisor: David Rincón Rivera, Feb. 17, 2017, 115 pages; upcommons.upc.edu/bitstream/handle/2117/101879/memoria_v2.pdf.
"Network Functions Virtualisation (NFV); Use Cases," ETSI, GS NFV 001 v1.1.1, Architectural Framework, © European Telecommunications Standards Institute, Oct. 2013, 50 pages.
Ersue, M. "ETSI NFV Management and Orchestration—An Overview," Presentation at the IETF# 88 Meeting, Nov. 3, 2013, 14 pages, www.ietf.org/proceedings/88/slides/slides-88-opsawg-6.pdf.
"Cisco and Intel High-Performance VNFs on Cisco NFV Infrastructure," White Paper, © 2016 Cisco|Intel, Oct. 2016, 7 pages.
Pierre-Louis, M., "OpenWhisk: A quick tech preview," DeveloperWorks Open, IBM, Feb. 22, 2016, 7 pages; developer.ibm.com/open/2016/02/22/openwhisk-a-quick-tech-preview/.
Hendrickson, S., et al. "Serverless Computation with OpenLambda." Elastic 60, University of Wisconsin, Madison, Jun. 20, 2016, 7 pages, www.usenix.org/system/files/conference/hotcloud16/hotcloud16_hendrickson.pdf.
"Understanding Azure A Guide for Developers," Microsoft Corporation, Copyright © 2016 Microsoft Corporation, 29 pages.
Yadav, R., "What Real Cloud-Native Apps Will Look Like," Crunch Network, Aug. 3, 2016, 8 pages; techcrunch.com/2016/08/03/what-real-cloud-native-apps-will-look-like/.
Aldrin, S., et al. "Service Function Chaining Operation, Administration and Maintenance Framework," Internet Engineering Task Force, Oct. 26, 2014, 13 pages.
Author Unknown, "ANSI/SCTE 35 2007 Digital Program Insertion Cueing Message for Cable," Engineering Committee, Digital Video Subcommittee, American National Standard, Society of Cable Telecommunications Engineers, © Society of Cable Telecommunications Engineers, Inc. 2007 All Rights Reserved, 140 Philips Road, Exton, PA 19341; 42 pages.
Author Unknown, "CEA-708," from Wikipedia, the free encyclopedia, Nov. 15, 2012; 16 pages http://en.wikipedia.org/w/index.php?title=CEA-708&oldid=523143431.
Author Unknown, "Digital Program Insertion," from Wikipedia, the free encyclopedia, Jan. 2, 2012; 1 page en.wikipedia.org/w/indec.php?title=Digital_Program_Insertion&oldid=469076482.
Author Unknown, "Dynamic Adaptive Streaming over HTTP," from Wikipedia, the free encyclopedia, Oct. 25, 2012; 3 pages, en.wikipedia.org/w/index.php?title=Dynannic_Adaptive_Streanning_over_HTTP&oldid=519749189.
Author Unknown, "GStreamer and in-band metadata," from RidgeRun Developer Connection, Jun. 19, 2012, 5 pages developersidgerun.conn/wiki/index.php/GStreanner_and_in-band_nnetadata.
Author Unknown, "ISO/IEC JTC 1/SC 29, Information Technology—Dynamic Adaptive Streaming over HTTP (DASH)—Part 1: Media Presentation Description and Segment Formats," International Standard © ISO/IEC 2012—All Rights Reserved; Jan. 5, 2012; 131 pages.
Author Unknown, "M-PEG 2 Transmission," © Dr. Gorry Fairhurst, 9 pages [Published on or about Jan. 12, 2012] www.erg.abdn.ac.uk/future-net/digital-video/mpeg2-trans.html.
Author Unknown, "MPEG Transport Stream," from Wikipedia, the free encyclopedia, Nov. 11, 2012; 7 pages, en.wikipedia.org/w/index.php?title=MPEG_transport_streann&oldid=522468296.
Author Unknown, "3GPP TR 23.803 V7.0.0 (Sep. 2005) Technical Specification: Group Services and System Aspects; Evolution of Policy Control and Charging (Release 7)," 3rd Generation Partnership Project (3GPP), 650 Route des Lucioles—Sophia Antipolis Valbonne—France, Sep. 2005; 30 pages.
Author Unknown, "3GPP TS 23.203 V8.9.0 (Mar. 2010) Technical Specification: Group Services and System Aspects; Policy and Charging Control Architecture (Release 8)," 3rd Generation Partnership Project (3GPP), 650 Route des Lucioles—Sophia Antipolis Val bonne—France, Mar. 2010; 116 pages.
Author Unknown, "3GPP TS 23.401 V13.5.0 (Dec. 2015) Technical Specification: 3rd Generation Partnership Project; Technical Specification Group Services and System Aspects; General Packet Radio Service (GPRS) enhancements for Evolved Universal Terrestrial Radio Access Network (E-UTRAN) access (Release 13)," 3GPP, 650 Route des Lucioles—Sophia Antipolis Valbonne—France, Dec. 2015, 337 pages.
Author Unknown, "3GPP TS 23.401 V9.5.0 (Jun. 2010) Technical Specification: Group Services and Systems Aspects; General Packet Radio Service (GPRS) Enhancements for Evolved Universal Terrestrial Radio Access Network (E-UTRAN) Access (Release 9)," 3rd Generation Partnership Project (3GPP), 650 Route des Lucioles—Sophia Antipolis Valbonne—France, Jun. 2010; 259 pages.
Author Unknown, "3GPP TS 29.212 V13.1.0 (Mar. 2015) Technical Specification: 3rd Generation Partnership Project; Technical Specification Group Core Network and Terminals; Policy and Charging Control (PCC); Reference points (Release 13)," 3rd Generation Partnership Project (3GPP), 650 Route des Lucioles—Sophia Antipolis Valbonne—France, Mar. 2015; 230 pages.
Boucadair, Mohamed, et al., "Differentiated Service Function Chaining Framework," Network Working Group Internet Draft draft-boucadair-network-function-chaining-03, Aug. 21, 2013, 21 pages.
Fayaz, Seyed K., et al., "Efficient Network Reachability Analysis using a Succinct Control Plane Representation," 2016, ratul.org, pp. 1-16.
Halpern, Joel, et al., "Service Function Chaining (SFC) Architecture," Internet Engineering Task Force (IETF), Cisco, Oct. 2015, 32 pages.
Jiang, Yuanlong, et al., "Fault Management in Service Function Chaining," Network Working Group, China Telecom, Oct. 16, 2015, 13 pages.
Kumar, Surendra, et al., "Service Function Path Optimization: draft-kumar-sfc-sfp-optimization-00.txt," Internet Engineering Task Force, IETF; Standard Working Draft, May 10, 2014, 14 pages.
Penno, Reinaldo, et al. "Packet Generation in Service Function Chains," draft-penno-sfc-packet-03, Apr. 29, 2016, 25 pages.
Penno, Reinaldo, et al. "Services Function Chaining Traceroute," draft-penno-sfc-trace-03, Sep. 30, 2015, 9 pages.
Quinn, Paul, et al., "Network Service Header," Network Working Group, draft-quinn-sfc-nsh-02.txt, Feb. 14, 2014, 21 pages.
Quinn, Paul, et al., "Network Service Header," Network Working Group, draft-quinn-nsh-00.txt, Jun. 13, 2013, 20 pages.
Quinn, Paul, et al., "Network Service Header," Network Working Group Internet Draft draft-quinn-nsh-01, Jul. 12, 2013, 20 pages.
Quinn, Paul, et al., "Service Function Chaining (SFC) Architecture," Network Working Group Internet Draft draft-quinn-sfc-arch-05.txt, May 5, 2014, 31 pages.
Wong, Fei, et al., "SMPTE-TT Embedded in ID3 for HTTP Live Streaming, draft-smpte-id3-http-live-streaming-00," Informational Internet Draft, Jun. 2012, 7 pages tools.ietf.org/htnnl/draft-snnpte-id3-http-live-streaming-00.

* cited by examiner task_1:
task_id: 1
input_data: database id, host, port, credentials
task_action_function_code: Find the list of users from database
output_data: user list
next_task_id: 2

300

FIGURE 3 task_2:
task_id: 2
input_data: user list
task_action_function_code: send email to users
output_data: status of emailing
next_task_id: None

Rule:
If <the length of the output_data of task_1> > 1,000,000 :
Then, use serverless_environment_ worker
Else, use serverless_environment_2 worker

SERVERLESS COMPUTING AND TASK SCHEDULING

TECHNICAL FIELD

This disclosure relates in general to the field of computing and, more particularly, to serverless computing and task scheduling.

BACKGROUND

Cloud computing aggregates physical and virtual compute, storage, and network resources in the "cloud" and offers users many ways to utilize the resources. One kind of product leveraging cloud computing is called Serverless Computing. Serverless computing offers a high level of compute abstraction, with a great deal of scalability. Developers no longer need to worry about the underlying physical or even virtual infrastructure in the cloud. Often, serverless computing frameworks are offered as a service, e.g., Amazon Web Services (AWS) Lambda (a compute service that runs code in response to events (making serverless computing an event-driven framework) and automatically manages the compute resources required by the code). Developers can pay for compute time consumed. Code can be uploaded to the serverless computing framework, and the serverless computing framework handles the rest.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 3 shows an exemplary task definition for a first task, according to some embodiments of the disclosure;

FIG. 4 shows an exemplary task definition for a second task chained to the first task, according to some embodiments of the disclosure;

FIG. 5 shows an exemplary rule defined for the second task based on an output of the first task, according to some embodiments of the disclosure;

DETAILED DESCRIPTION OF EXAMPLE EMBODIMENTS

Overview

Figure 1:
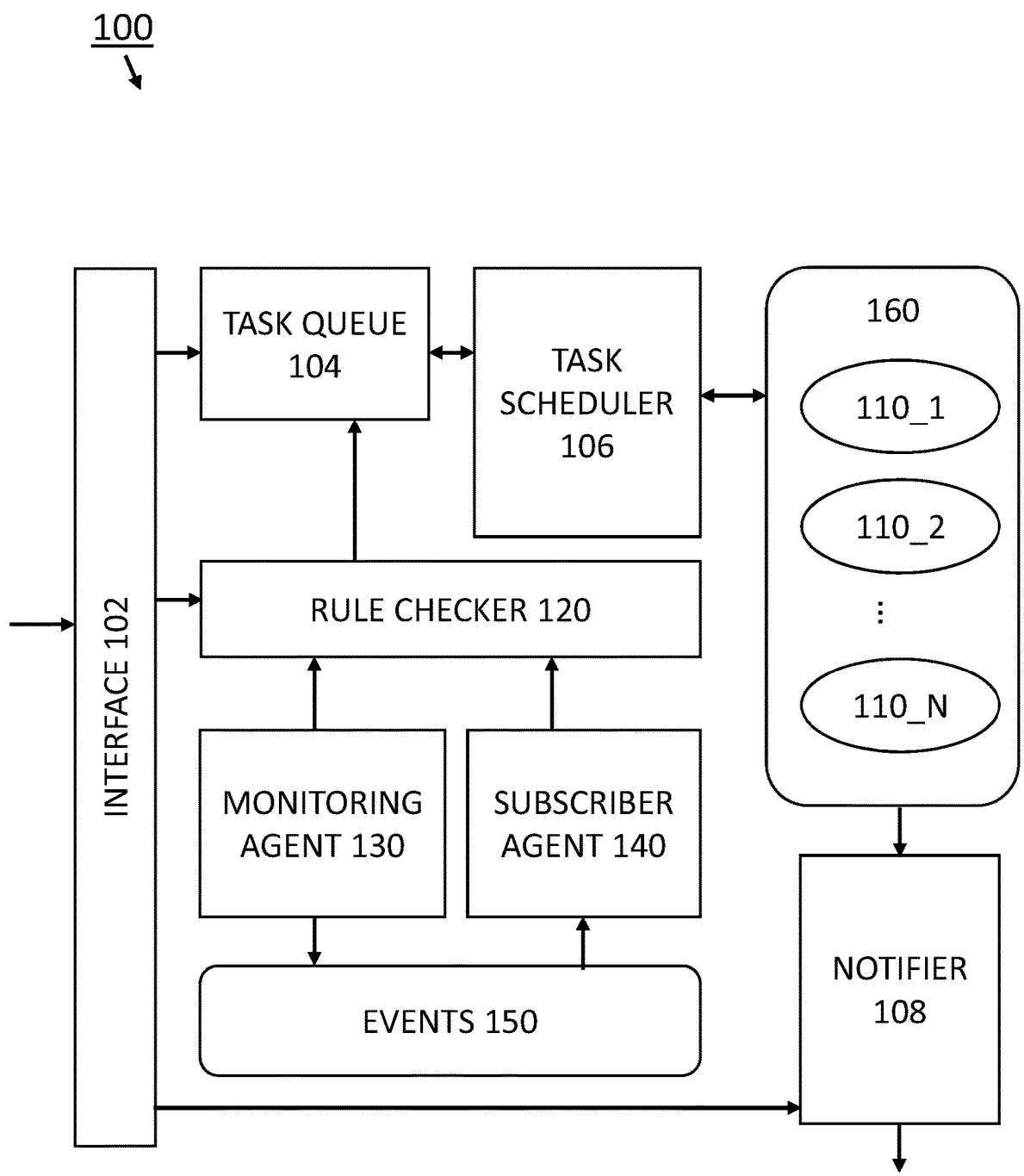
FIG. 1 illustrates an exemplary serverless computing system, according to some embodiments of the disclosure.

One aspect of the disclosure relates to, among other thing, a method for serverless computing comprising: receiving a task definition, wherein the task definition comprises a first task and a second task chained to the first task; adding the first task and the second task to a task queue; executing the first task from the task queue using hardware computing resources in a first serverless environment associated with a first serverless environment provider; and executing the second task from the task queue using hardware computing resources in a second serverless environment selected based on a condition on an output of the first task.

In other aspects, apparatuses comprising means for carrying out one or more of the method steps are envisioned by the disclosure. As will be appreciated by one skilled in the art, aspects of the disclosure, in particular the functionality associated with modelling and deploying scalable micro services herein, may be embodied as a system, a method or a computer program product. Accordingly, aspects of the disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Functions described in this disclosure may be implemented as an algorithm executed by a processor, e.g., a microprocessor, of a computer. Furthermore, aspects of the disclosure may take the form of a computer program product embodied in one or more computer readable media having computer readable program code embodied, e.g., stored, thereon.

EXAMPLE EMBODIMENTS

Understanding Serverless Computing

Serverless computing works by having developers or users upload a piece of code to a serverless computing environment (or serverless computing platform or serverless environment), and the serverless computing environment runs the code without having to burden the developer or user with the setup of workers (i.e., networked hardware resources in the cloud, including compute, storage, and network resources) to execute the code. The serverless computing environment can be event driven, meaning that the code can execute or perform some kind of computations triggered by events. The triggering can be dictated by rules defined in the serverless computing environment. In some cases, the code is executed on demand, or according to a predetermined schedule. To use a serverless computing environment, a developer or user can upload a piece of code to be executed. The developer or user is abstracted from the setup and execution of the code in the networked hardware resources in the cloud.

There are many different flavors of serverless computing environments (in some cases, the serverless computing environments are virtualized computing environments having an application programming interface which abstracts the user from the implementation and configuration of a service or application in the cloud). Some serverless computing environments may have restrictions on the kind of code that it can run, i.e., some serverless computing environment can only execute code written in a number of supported programming languages. Some serverless computing environments may differ in the operating systems on which the code is executed. Some serverless computing environments may differ in their support for dependencies management (libraries for executing code). If the serverless computing environments are part of a public cloud or is a service offered by a company, the serverless computing environments may have different associated costs. Some serverless computing environments may be part of a private cloud, where the networked hardware resources are on-premise and managed by the developer. Scalability, availability, and resource limits may differ from one serverless computing environment to another. Some serverless computing environments may have different limits on the maximum number of functions, concurrent executions, maximum execution duration length, etc. Some serverless computing environments may only support certain specific event subscribers or monitoring platforms. Some serverless computing environments may only support certain kinds of notifications, logging, etc. Serverless computing environments can be different in many respects.

Serverless computing aims to provide a higher level of compute abstraction which allows developers and users to not have to worry about the underlying physical or even virtual infrastructure. While it is easy for a developer to use the public service offerings of serverless computing environments, it is not so trivial for a developer to extend serverless computing to a private cloud or a hybrid cloud environment.

It would be advantageous to build an improved serverless computing system or infrastructure that can leverage offerings from the different serverless computing environments as well as other cloud computing environments. When serverless computing environments are so different from each other and when it is desirable to integrate both public and private clouds (hybrid cloud), designing the improved serverless computing system can be challenging.

Integrating Heterogeneous Serverless Computing Environments into One Unified Serverless Computing System or Infrastructure FIG. 1 illustrates an exemplary serverless computing system 100, according to some embodiments of the disclosure. The system 100 includes an interface 102, task queue 104, task scheduler 106, and networked hardware resources 160 having workers 110_1, 110_2, . . . 110_N.

The interface 102 allows a developer or user (machine) to interact with the serverless computing system 100 via a predefined application programming interface (API). Via the interface 102, a user can provide a task definition to create an action (associated with some piece of code or script) for the serverless computing system 100 to execute. The interface 102 can include a command line and/or a graphical user interface to facilitate the user interactions, such as inputting and specifying the task definition. The interface 102 is an abstraction layer which would allow a developer or user to use different serverless computing environments deployed in the public cloud(s) and/or private cloud(s).

As an illustration, the following are exemplary actions available via the API:

| url | request type | remarks |
| --- | --- | --- |
| /actions | GET | list actions |
| /actions | POST | create an action |
| /actions/:id | GET | get an action |
| /actions/:id | PUT | update an action |
| /actions/:id | DELETE | delete an action |
| /actions/:id/tag | POST | snapshot a current action |
| /actions/:id/execute | POST | execute an action |
| /executions | GET | list executions |
| /executions/:id | GET | get an execution |
| /executions/:id/retry | POST | retry an execution |
| /executions/:id/cancel | DELETE | cancel scheduled execution |
| /executions/:id/logs | GET | get execution logs |
| /rules | GET | list rules |
| /rules | POST | create rule |
| /rules/:id | GET | get a rule |
| /rules/:id | PUT | update a rule |

-continued

| url | request type | remarks |
| --- | --- | --- |
| /rules/:id | DELETE | delete a rule |
| /subscribers | GET | list subscribers |
| /subscribers | POST | create a subscriber |
| /subscribers/:id | PUT | update a subscriber |
| /subscribers/:id | DELETE | delete a subscriber |
| /subscribers/:id/start | PUT | start a subscriber daemon |
| /subscribers/:id/stop | PUT | stop a subscriber daemon |
| /notifiers | GET | list notifiers |
| /notifiers | POST | create a notifier |
| /notifiers/:id | PUT | update a notifier |
| /notifiers/:id | DELETE | delete a notifier |

Task queue 104 can include one or more data structures which stores tasks which are to be executed by the serverless computing system 100. The tasks which are stored in the task queue 104 can come from a plurality of sources, including from a developer/user via the interface 102. A task can be considered an execution unit or an action, which can include a set of binary codes and a shell script. Via interface 102, developers/users can push tasks to the task z Task scheduler 106 is configured schedule and decide how to execute the tasks in the task queue 104. The task scheduler 106 can be responsible for assigning tasks to any one of the workers 110_1, 110_2, . . . 110_N. In some embodiments, the task scheduler 106 can implement optimization the assignment of tasks from the task queue. In some embodiments, the task scheduler 106 may assign tasks from the task queue according to a suitable assignment scheme, e.g., an assignment scheme which assigns task to random workers, etc.

One unique aspect of the serverless computing system 100 is that networked hardware resources 160 having workers 110_1, 110_2, . . . 110_N can include different serverless computing environments and/or cloud computing environments with heterogeneous characteristics. For instance, networked hardware resources 160 having workers 110_1, 110_2, . . . 110_N can be implemented in different environments, including but not limited to, AWS Lambda, IBM OpenWisk, Google Cloud Functions, Windows Azure Functions, OpenStack, local Docker environment (e.g., private cloud with support for implementing Containers), local environment (e.g., private cloud) with support for virtual machines, local environment (e.g., private cloud) with support for microservices, etc. The networked hardware resources 160 can include resources in one or more of the following: one or more public clouds, one or private clouds, and one or more hybrid clouds (having both public and private clouds).

The interface 102 abstracts the APIs from the different environments and enables the integration of different environments under a unified API. In some embodiments, the interface 102 also exposes the workers 110_1, 110_2, . . . 110_N in a way to enable developers/users to access the environments or define rules based on the environments. Task scheduler can select one of the available workers 110_1, 110_2, . . . 110_N from any suitable serverless computing environment (private cloud, public cloud, local Docker, etc.), since system 100 is implemented on top of many different serverless computing environments and/or cloud computing environments. This aspect provides a great deal of flexibility for the developer to execute tasks. A developer can even deploy functions in a public and private setting (executing tasks in a hybrid setting). Such aspect can potentially speed up the development of applications or new cloud native applications (in the fields such as internet of things, network function virtualization, etc.).

As an event-driven architecture, the serverless computing system 100 can further include rule checker 120, monitoring agent 130 and/or subscriber manager 140, and events 150. The system 100 can include more than one monitoring agent 130. The system 100 can include more than one subscriber agent 130. The system 100 can include more than one events (event sources) 150. The serverless computing system 100 can deal with both pull-type and push-type event driven workflows. Rule checker 120 can receive rules (e.g., rule definitions) from a developer/user, and/or have predefined rules. The rules can be of a form of event condition action (ECA), which can check one or more events against one or more conditions and performs one or more actions based on the outcome of the check. In some embodiments, a monitoring agent 130 (e.g., Kafka monitoring agent, Rabbit monitoring agent, etc.) can poll an external event source, i.e., events 150. The events monitored by the monitoring agent 130 can be checked by rule checker 120 based on the rules therein. If an action is to be performed based on one or more rules, the one or more actions are to be added to the task queue as one or more tasks. In some embodiments, a subscriber agent 140 can subscribe to an external event source, i.e., events 150. The events subscribed by the subscriber agent 140 can be checked by rule checker 120 based on the rules therein. If one or more actions are be performed based on one or more rules, the one or more actions can be added to the task queue as one or more tasks. In some embodiments, any one or more of the workers 110_1, 110_2, . . . 110_N may generate output which can be fed to events 150, which could in turn trigger tasks to be added to the task queue by the rule checker 120 and either the monitoring agent 130 and/or the subscriber agent 140. In some embodiments, any one or more of the workers 110_1, 110_2, . . . 110_N may generate output which can be fed to rule checker 120, which could in turn trigger tasks to be added to the task queue.

In some embodiments, the serverless computing system 100 can include a notification system. The interface 102 can accept notification definitions which requests notifier 108 to output one or more notifications based on one or more outputs from any one or more of the workers 110_1, 110_2, . . . 110_N. For instance, the success/failure/status from an execution of a task can be output to a developer/user by notifier 108. In another instance, the output data or a derivation of the output data from executing of a task by any one or more of the workers 110_1, 110_2, . . . 110_N can be output to a developer/user by notifier 108. Exemplary notifier 108 includes Hypertext Transfer Protocol (HTTP) notifier, Kafka notifier, etc.

In some embodiments, any one of the workers 110_1, 110_2, . . . 110_N can also push/add one or more tasks to the task queue 104.

Task Definition and Processing of Task Chains

Figure 2:
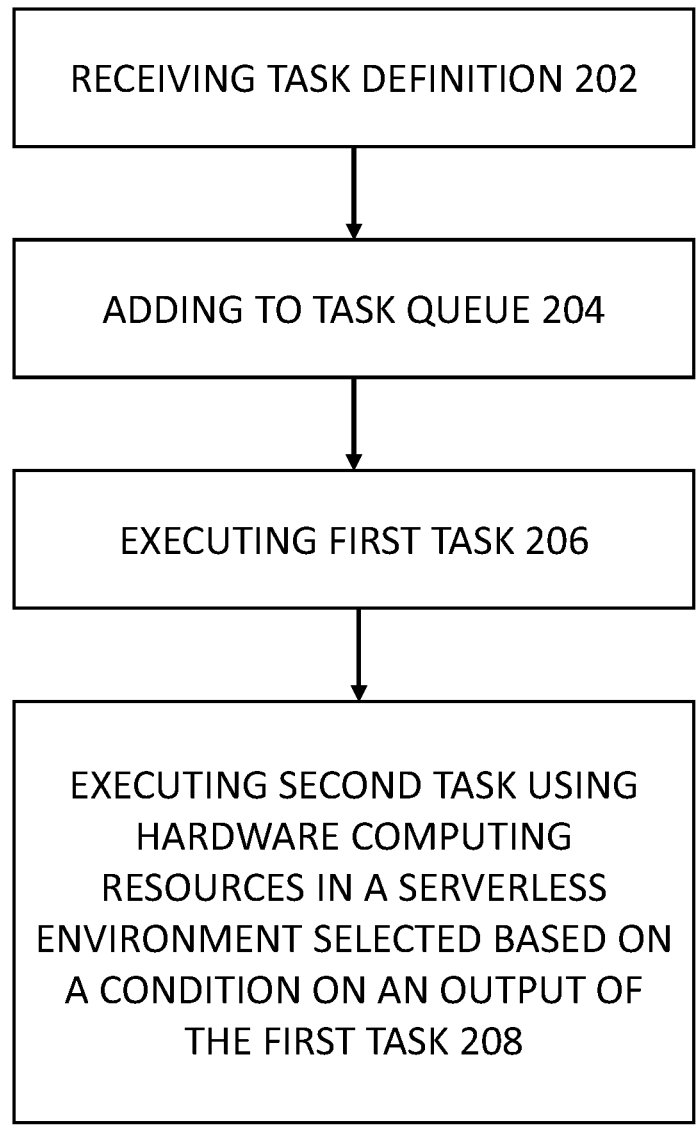
FIG. 2 illustrates a method for serverless computing, according to some embodiments of the disclosure.

Different from other serverless computing architectures, the serverless computing architecture 100 can receive a task definition which can specify a task chain, e.g., describing a work flow or data processing flow. A task chain can link two more tasks together to be executed in sequence (e.g., one after another). In some cases, a task chain can be a directed acylic graph. For instance, a first task can generate some output, and a subsequent second task can process the output from the first task. FIG. 2 illustrates a method for serverless computing which receives a task chain, according to some embodiments of the disclosure. In 202, interface (e.g., interface of 102 of FIG. 1) can receive a task definition. The definition can come from a developer/user. In some cases, the task definition can come from other sources such as rule checker 120, and workers 110_1, 110_2, . . . 110_N. The task definition comprises a first task and a second task chained to the first task (i.e., the task chain). In 204, the interface 102 can add the first task and the second task to a task queue, e.g., task queue 104. In 206, the networked hardware resources (e.g., networked hardware resources 160 having workers 110_1, 110_2, . . . 110_N) can execute the first task from the task queue in a first serverless environment associated with a first serverless environment provider. In 208, the networked hardware resources (e.g., networked hardware resources 160 having workers 110_1, 110_2, . . . 110_N) can execute the second task from the task queue in a second serverless environment selected based on a condition on an output of the first task. In some cases, the first and second serverless computing environments are the same. In some cases, the first and second serverless computing environments are not the same. The latter can be particularly advantageous since some execution of tasks may be more suited for one serverless computing environment over another. The serverless computing system 100 seen in FIG. 1 enables the task chain to be split to tasks (or sub-tasks), where each of the tasks in the task chain can be executed in different serverless computing environments (e.g., task scheduler can assign the tasks to different workers from different serverless computing environments).

A task definition can be provided by the developer/user, and the task definition can take the form of: T→{task_id, input_data, task_action_function_code, output_data, next_task_id}. An exemplary task definition comprises: a first task identifier identifying the first task "task_id", a first pointer/name to input_data "input_data", a task action function code "task_action function code", a second pointer/name to output data "output_data", and a second task identifier identifying the second task "next_task_id". FIG. 3 shows an exemplary task definition for a first task 300, according to some embodiments of the disclosure. FIG. 4 shows an exemplary task definition for a second task 400 chained to the first task, according to some embodiments of the disclosure. The first task specifies that the next_task_id to be "2" so that the first task can be chained to the second task. The first task's action finds a list of users from a database and outputs the list of users ("user list"). The second task's action takes the list of users and sends email to users.

Besides the ability to define a next task as part of the task definition, a developer/user can specify the next serverless environment for the next task, based on the output of the current task. Extending the method described in FIG. 2, the method can further include receiving a rule specifying the second serverless environment to be used for the second task if the condition of the output of the first task is met. The rule can further specify a third serverless environment (different from the second serverless environment) to be used for the second task if the condition of the output of the first task is not met. FIG. 5 shows an exemplary rule defined for the second task based on an output of the first task, according to some embodiments of the disclosure. In the exemplary rule, if the length of the output_data of the first task 300 is greater than 1,000,000 (a condition on the output of the first task), then use "serverless_environment_1 worker", else, use "serverless_environment_2 worker" (serverless_environment_1 is different from serverless_environment_2). The rule drives the selection of a next task execution serverless environment based on a condition on the previous task. This rule can be advantageous if "serverless_environment_2" is a better (e.g., cheaper, more efficient, etc.) task execution environment for the second task when the length of the output data is large.

Task Scheduling

Figure 6:
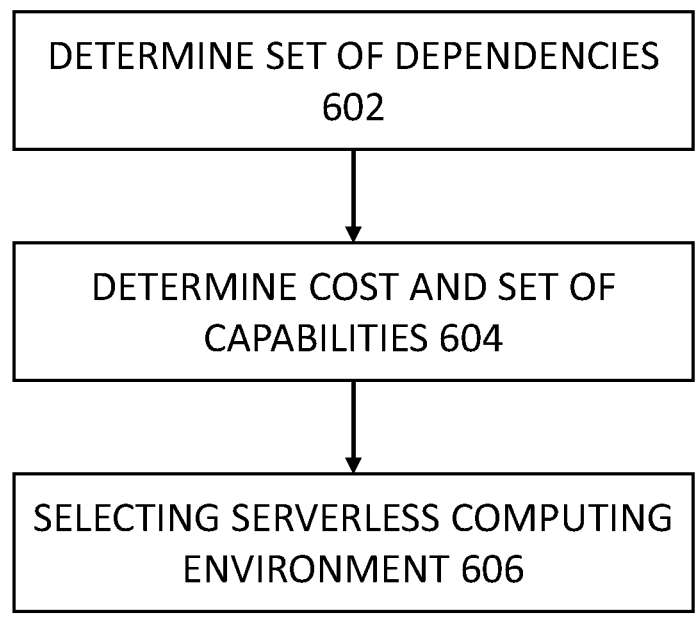
FIG. 6 shows an exemplary method for scheduling a task chain, according to some embodiments of the disclosure.

The function of assigning tasks to a worker in a particular serverless environment (function of task scheduler 106 of FIG. 1) is not trivial. Most serverless environments are delivered as a service, but the characteristics and capabilities differ drastically from one service to another. One environment can be part of the public cloud, or on-premise in a local environment. Selecting an optimized serverless environment for the task at hand can be challenging. FIG. 6 shows an exemplary method for scheduling a task chain, according to some embodiments of the disclosure. The method can enable an optimized selection of serverless computing environments and/or virtualized computing environments (i.e. assign a task to an optimal worker in a task execution environment). The method models dependencies or requirements of a task as constraints. The method also models capabilities of the serverless environments also as constraints. Each serverless environment also has a cost associated with it. In 602, a task scheduler determines a set of dependency constraints for each task of a task chain in the task queue is determined. In 604, the task scheduler determines a cost and a set of capability(-ies) associated with each serverless computing environment. For example, a set of dependency constraints can include the programming language of code for the task. A set of capabil(-ies) can also include a programming language that a serverless environment can execute. In some embodiments, a set of dependency constraints for a given task comprises a data locality compliance rule. In some embodiments, a set of dependency constraints for a given task comprises one or more requirements specified in a task definition associated with the given task. In some embodiments, a set of dependency constraints for a given task comprises a rule specifying a particular serverless environment to be used for the given task if a condition of an output of a task previous to the given task in the task chain is met (e.g., a rule, such as the one seen in FIG. 5). Some examples of these features are illustrated in FIGS. 7 and 8.

In 606, the task scheduler selects a serverless computing environment for each task of the task chain based on the sets of one or more dependency constraints, the costs, and the sets of one or more capabilities. Selecting the serverless computing environment can include minimizing sum of costs for all tasks in the task chain and ensuring the set of dependency constraints for each task in the task chain is satisfied by the set of capabilities associated with the serverless environment selected for each task in the task chain.

Figure 7:
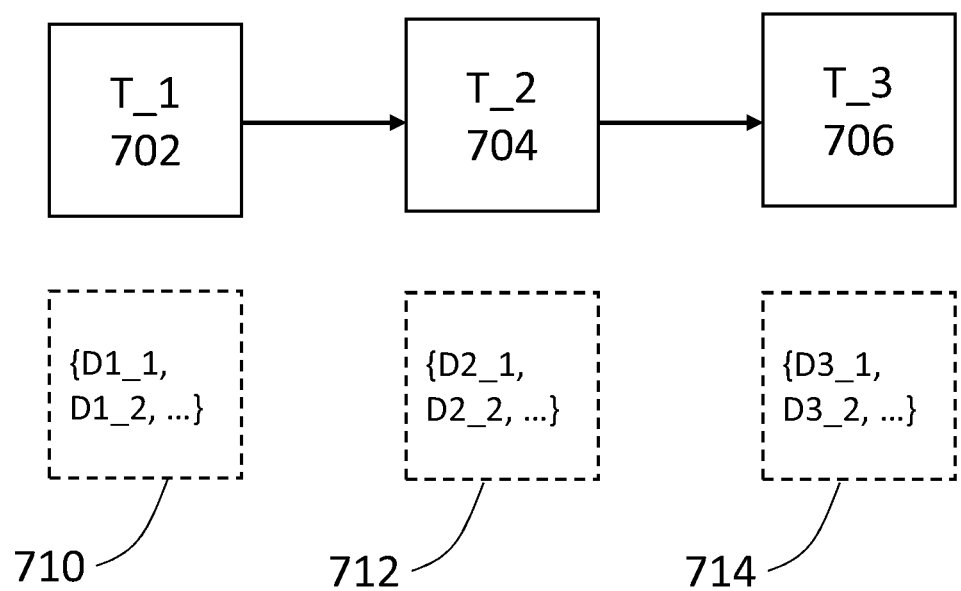
FIG. 7 illustrates a task chain and dependencies of each task in the task chain, according to some embodiments of the disclosure.
Figure 8:
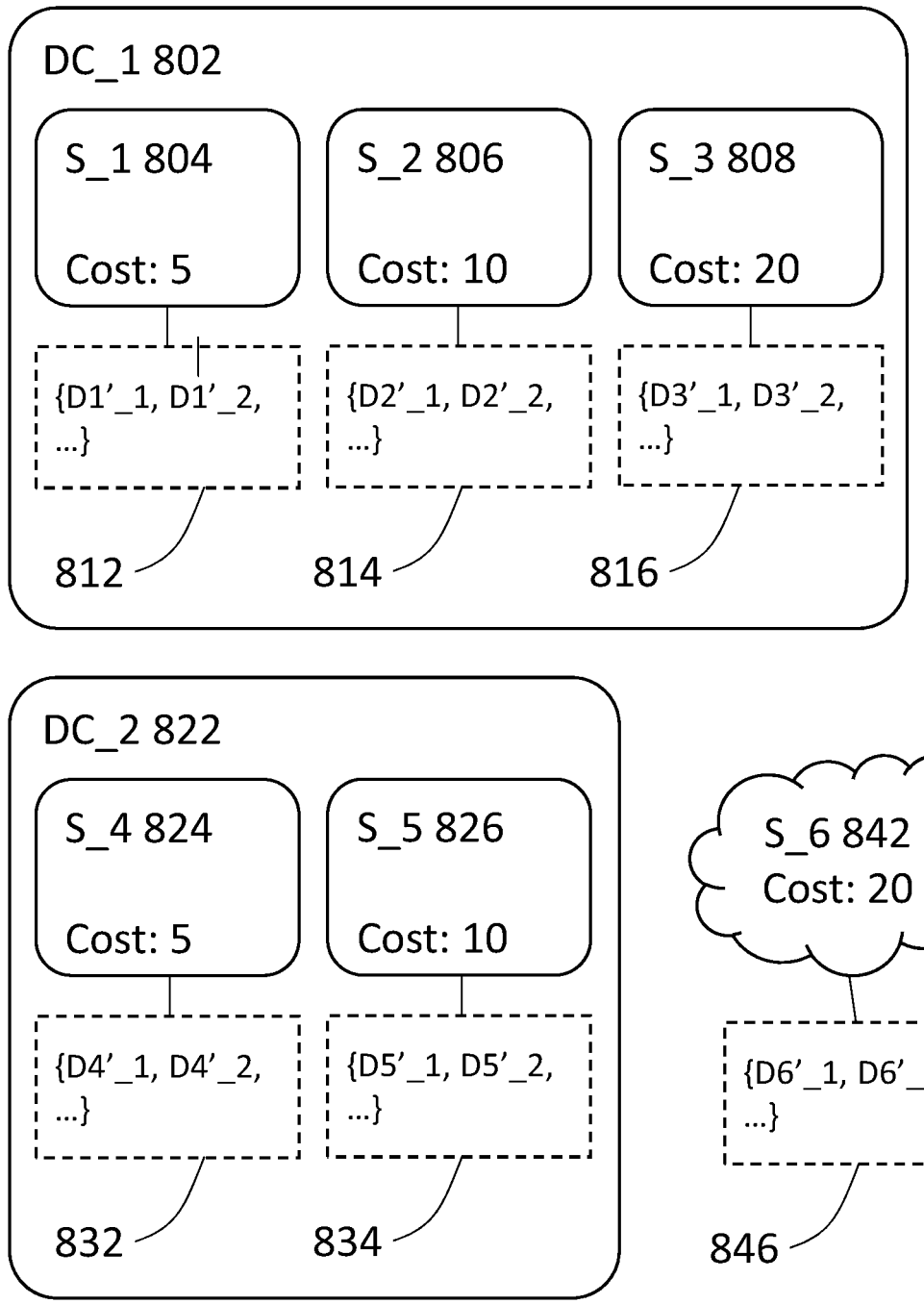
FIG. 8 shows exemplary serverless computing environments and workers, according to some embodiments of the disclosure.

FIG. 7 illustrates a task chain and dependencies of each task in the task chain, according to some embodiments of the disclosure. Every task—T, has a set of dependency constraints—{D1, D2, D3 . . . }. In the serverless computing environment described herein, the task queue may have a task chain to be fulfilled as per a single execution workflow. Consider a chain of tasks T={T_1, T_2, . . . T_i . . . } with similar constraints chains—{{D1_1, D1_2 . . . }, {D2_1, D2_2, . . . }, {Di_1, Di_2, . . . } . . . } For simplicity, three of such tasks in a task chain is shown as T_1 702, T_2 704, T_3 706 having corresponding sets of dependencies 710, 712, and 714.

Every serverless environment—S_j—has a cost factor per task Cj_i and some additional capability constraints—{Dj'_1, Dj'_2, Dj'_3 . . . }. Consider the set of all available serverless environments S={S1, S2, . . . S_j, . . . S_n}. The task scheduler can select a set of S_j from S for each T_i in T, such that the {Sum of costs Cj_i for all tasks T_i in T} is minimized or decreased, with constraints for task T_i—{Di_1, Di_2, . . . } being satisfied by the corresponding chosen serverless environment S_j's capabilities—{Dj'_1, Dj'_2, Dj'_3 . . . }. The resulting solution of this problem provides a right and optimized set of assignment pairs—{T_i, S_j} meaning the task T_i will be executed in the serverless environment S_j, and the assignment pairs would be most optimal distribution of tasks to different serverless environments.

FIG. 8 shows exemplary serverless computing environments and workers, according to some embodiments of the disclosure. Consider a task chain that involves a set of three tasks (e.g., as seen in FIG. 7), and a set of available serverless execution platforms—S_1 804 (cost=5), S_2 806 (cost=10), S_3 808 (cost=20), S_4 824 (cost=5), S_5 826 (cost=10), and S_6 846 (cost=20), out of which S_1 804, S_2 806, and S_3 808 are located in Datacenter DC_1 802, S_4 824 and S_5 826 can be in Datacenter DC_2 822, and S_6 846 can be in a public cloud serverless environment. Exemplary dependency constraints of each of the tasks, and exemplary capability constraints of each of the serverless environments as follows, in reference to both FIGS. 7 and 8.

Set of dependencies 710 of T_1 702 can include {D1_1: Data locality compliance rule: Data stays locally on premise in DC_1, D1_2: Needs numpy, python in an Ubuntu environments}

Set of dependencies 712 of T_2 704 can include {D2_1: Data locality compliance rule: text documents reside in a storage server in DC_2}

Set of dependencies 714 of T_3 706 can include {D3_1: Backup service should be local to storage server location in DC_2}

Set of capabilities 812 of S_1 804 can include {D1'_1: local Windows server environment}

Set of capabilities 814 of S_2 806 can include {D2'_1: has numpy, python Ubuntu container images}

Set of capabilities 816 of S_4 808 can include {D3'_1: has numpy, python Ubuntu container images}

Set of dependencies 832 of S_4 824 can include {D4'_1: has numpy, python Ubuntu container images}

Set of dependencies 826 of S_4 824 can include {D5'_1: has numpy, python Ubuntu container images}

Set of dependencies 832 of S_4 824 can include {D6'_1: has numpy, python Ubuntu container images}

Determining an optimized solution from the optimization problem can result in an assignment pair as follows, that satisfies all of the required constraints, as well optimizes on the total cost, based on the individual costs of each serverless environments. Tasks in a task chain are assigned to the least costing, and most fitting serverless environment, where the task can be executed (e.g., by workers in assigned serverless environments)

Task T_1 702 Serverless env: S_2 806

Task T_2 704 Serverless env: S_4 824

Task T_3 706 Serverless env: S_4 824

Data Processing System

Figure 9:
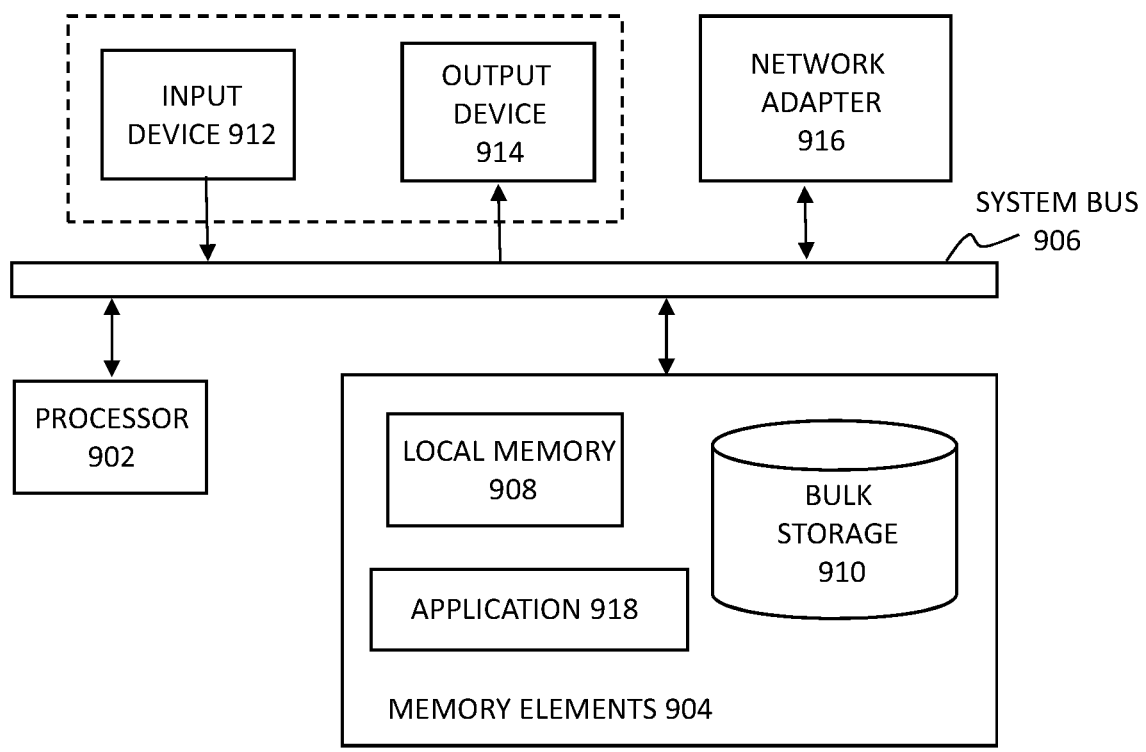
FIG. 9 illustrates an exemplary data processing system, according to some embodiments of the disclosure.

FIG. 9 depicts a block diagram illustrating an exemplary data processing system 900 (sometimes referred herein as a "node") that may be used to implement the functionality associated with any parts of the serverless computing system (100 of FIG. 1) or user (machines) accessing any one part of the serverless computing system (e.g., via interface 102), according to some embodiments of the disclosure. For instance, networked hardware resources having the functionalities implemented thereon, may have one or more of the components of the system 900.

As shown in FIG. 9, the data processing system 900 may include at least one processor 902 coupled to memory elements 904 through a system bus 906. As such, the data processing system may store program code within memory elements 904. Further, the processor 902 may execute the program code accessed from the memory elements 904 via a system bus 906. In one aspect, the data processing system may be implemented as a computer that is suitable for storing and/or executing program code. It should be appreciated, however, that the data processing system 900 may be implemented in the form of any system including a processor and a memory that is capable of performing the functions described within this specification.

The memory elements 904 may include one or more physical memory devices such as, for example, local memory 908 and one or more bulk storage devices 910. The local memory may refer to random access memory or other non-persistent memory device(s) generally used during actual execution of the program code. A bulk storage device may be implemented as a hard drive or other persistent data storage device. The processing system 900 may also include one or more cache memories (not shown) that provide temporary storage of at least some program code in order to reduce the number of times program code must be retrieved from the bulk storage device 910 during execution.

Input/output (I/O) devices depicted as an input device 912 and an output device 914 optionally can be coupled to the data processing system. User (machines) accessing the interface 102 would typically have such I/O devices. Examples of input devices may include, but are not limited to, a keyboard, a pointing device such as a mouse, or the like. Examples of output devices may include, but are not limited to, a monitor or a display, speakers, or the like. Input and/or output devices may be coupled to the data processing system either directly or through intervening I/O controllers. In an embodiment, the input and the output devices may be implemented as a combined input/output device (illustrated in FIG. 9 with a dashed line surrounding the input device 912 and the output device 914). An example of such a combined device is a touch sensitive display, also sometimes referred to as a "touch screen display" or simply "touch screen". In such an embodiment, input to the device may be provided by a movement of a physical object, such as e.g. a stylus or a finger of a user, on or near the touch screen display.

A network adapter 916 may also be coupled to the data processing system to enable it to become coupled to other systems, computer systems, remote network devices, and/or remote storage devices through intervening private or public networks. The network adapter may comprise a data receiver for receiving data that is transmitted by said systems, devices and/or networks to the data processing system 900, and a data transmitter for transmitting data from the data processing system 900 to said systems, devices and/or networks. Modems, cable modems, and Ethernet cards are examples of different types of network adapter that may be used with the data processing system 900.

As pictured in FIG. 9, the memory elements 904 may store an application 918. In various embodiments, the application 918 may be stored in the local memory 908, the one or more bulk storage devices 910, or apart from the local memory and the bulk storage devices. It should be appreciated that the data processing system 900 may further execute an operating system (not shown in FIG. 9) that can facilitate execution of the application 918. The application 918, being implemented in the form of executable program code, can be executed by the data processing system 900, e.g., by the processor 902. Responsive to executing the application, the data processing system 900 may be configured to perform one or more operations or method steps described herein.

Persons skilled in the art will recognize that while the elements 902-918 are shown in FIG. 9 as separate elements, in other embodiments their functionality could be implemented in lesser number of individual elements or distributed over a larger number of components.

EXAMPLES

Example 1 is a method for serverless computing, comprising: receiving a task definition, wherein the task definition comprises a first task and a second task chained to the first task; adding the first task and the second task to a task queue; executing the first task from the task queue using hardware computing resources in a first serverless environment associated with a first serverless environment provider; and executing the second task from the task queue using hardware computing resources in a second serverless environment selected based on a condition on an output of the first task.

In Example 2, the method of Example 1 can further include receiving a rule specifying the second serverless environment to be used for the second task if the condition of the output of the first task is met.

In Example 3, the method of Example 2 can further include: the rule further specifying a third serverless environment to be used for the second task if the condition of the output of the first task is not met.

In Example 4, the method of any one of Examples 1-3 can further include the task definition comprising: a first task identifier identifying the first task, a first pointer to input data, a task action function code, a second pointer to output data, and a second task identifier identifying the second task.

In Example 5, the method of any one of Examples 1-4 can further include: determining a set of dependency constraints for each task of a task chain in the task queue; determining a cost and a set of capabilities associated with each serverless computing environment; and selecting a serverless computing environment for each task of the task chain based on the sets of one or more dependency constraints, the costs, and the sets of one or more capabilities.

In Example 6, the method of Example 5 can further include: selecting the serverless computing environment comprising minimizing sum of costs for all tasks in the task chain and ensuring the set of dependency constraints for each task in the task chain is satisfied by the set of capabilities associated with the serverless environment selected for each task in the task chain.

In Example 7, the method of Example 5 or 6 can further include: the set of dependency constraints comprising the programming language of code for the task, and the set of capabilities comprises a programming language that a serverless environment can execute.

In Example 8, the method of any one of Examples 5-7 can further include: a set of dependency constraints for a given task comprising a data locality compliance rule.

In Example 9, the method of any one of Examples 5-8 further include a set of dependency constraints for a given task comprising one or more requirements specified in a task definition associated with the given task.

In Example 10, the method of Example 5-9 can further include: a set of dependency constraints for a given task comprises a rule specifying a particular serverless environment to be used for the given task if a condition of an output of a task previous to the given task in the task chain is met.

Example 11 is a system comprising: at least one memory element; at least one processor coupled to the at least one memory element; an interface that when executed by the at least one processor is configured to: receive a task definition, wherein the task definition comprises a first task and a second task chained to the first task; and adding the first task and the second task to a task queue; and one or more workers provisioned in networked hardware resources of a serverless computing environment that when executed by the at least one processor is configured to: execute the first task from the task queue using hardware computing resources in a first serverless environment associated with a first serverless environment provider; and execute the second task from the task queue using hardware computing resources in a second serverless environment selected based on a condition on an output of the first task.

In Example 12, the system of Example 11 can further include: the interface that when executed by the at least one processor being further configured to: receive a rule specifying the second serverless environment to be used for the second task if the condition of the output of the first task is met.

In Example 13, the system of Example 12 can further include the rule further specifying a third serverless environment to be used for the second task if the condition of the output of the first task is not met.

In Example 14, the system of any one of Examples 11-13 can further include the task definition comprises a first task identifier identifying the first task, a first pointer to input data, a task action function code, a second pointer to output data, and a second task identifier identifying the second task.

In Example 15, the system of any one of Examples 11-14 can further include a task scheduler that when executed by the at least one processor being configured to: determining a set of dependency constraints for each task of a task chain in the task queue; determining a cost and a set of capability(-ies) associated with each serverless computing environment; and selecting a serverless computing environment for each task of the task chain based on the sets of one or more dependency constraints, the costs, and the sets of one or more capabilities.

In Example 16, the system of Example 15 can further include: the task scheduler that when executed by the at least one processor being configured to select the computing environment comprising minimizing sum of costs for all tasks in the task chain and ensuring the set of dependency constraints for each task in the task chain is satisfied by the set of capabilities associated with the serverless environment selected for each task in the task chain.

In Example 17, the system of Example 15 or 16 can further include the set of dependency constraints comprising the programming language of code for the task, and the set of capabil(-ies) comprises a programming language that a serverless environment can execute.

In Example 18, the system of any one of Examples 15-17 can further include a set of dependency constraints for a given task comprising a data locality compliance rule.

In Example 19, the system of any one of Examples 15-18 can further include a set of dependency constraints for a given task comprises one or more requirements specified in a task definition associated with the given task.

In Example 20, the system of any one of Examples 15-19 can further include a set of dependency constraints for a given task comprises a rule specifying a particular serverless environment to be used for the given task if a condition of an output of a task previous to the given task in the task chain is met.

Example 21 include one or more computer-readable non-transitory media comprising one or more instructions, for serverless computing and task scheduling, that when executed on a processor configure the processor to perform one or more operations comprising: receiving a task definition, wherein the task definition comprises a first task and a second task chained to the first task; adding the first task and the second task to a task queue; executing the first task from the task queue using hardware computing resources in a first serverless environment associated with a first serverless environment provider; and executing the second task from the task queue using hardware computing resources in a second serverless environment selected based on a condition on an output of the first task.

In Example 22, the media of Example 21 can further include the operations further comprising: receiving a rule specifying the second serverless environment to be used for the second task if the condition of the output of the first task is met.

In Example 23, the media of Example 22 can further include the rule further specifying a third serverless environment to be used for the second task if the condition of the output of the first task is not met.

In Example 24, the media of Examples 21-23 can further include the task definition comprising a first task identifier identifying the first task, a first pointer to input data, a task action function code, a second pointer to output data, and a second task identifier identifying the second task.

In Example 25, the media of any one of Examples 21-24 can further include the operations further comprising: determining a set of dependency constraints for each task of a task chain in the task queue; determining a cost and a set of capabilities associated with each serverless computing environment; and selecting a serverless computing environment for each task of the task chain based on the sets of one or more dependency constraints, the costs, and the sets of one or more capabilities.

In Example 26, the media of Example 25 can further include selecting the serverless computing environment comprising minimizing sum of costs for all tasks in the task chain and ensuring the set of dependency constraints for each task in the task chain is satisfied by the set of capabilities associated with the serverless environment selected for each task in the task chain.

In Example 27, the media of Examples 25 or 26 can further include the set of dependency constraints comprising the programming language of code for the task, and the set of capabilities comprises a programming language that a serverless environment can execute.

In Example 28, the media of any one of Examples 25-27, can further include a set of dependency constraints for a given task comprising one or more of the following: a data locality compliance rule In Example 29, the media of any one of Examples 25-28 can further include a set of dependency constraints for a given task comprising one or more requirements specified in a task definition associated with the given task.

In Example 30, the media of any one of Examples 25-28, can further include a set of dependency constraints for a given task comprising a rule specifying a particular serverless environment to be used for the given task if a condition of an output of a task previous to the given task in the task chain is met.

Example 31 is one or more apparatus comprising means for carrying out any one or more parts of the methods described in Examples 1-10.

As used herein "a set" of, e.g., dependency constraints, requirements, capabilities, etc., can include just one of such element in the set, or more than one elements in the set.

Variations and Implementations

Within the context of the disclosure, the cloud includes a network used herein represents a series of points, nodes, or network elements of interconnected communication paths for receiving and transmitting packets of information that propagate through a communication system. A network offers communicative interface between sources and/or hosts, and may be any local area network (LAN), wireless local area network (WLAN), metropolitan area network (MAN), Intranet, Extranet, Internet, WAN, virtual private network (VPN), or any other appropriate architecture or system that facilitates communications in a network environment depending on the network topology. A network can comprise any number of hardware or software elements coupled to (and in communication with) each other through a communications medium.

As used herein in this Specification, the term 'network element' or 'node' in the cloud is meant to encompass any of the aforementioned elements, as well as servers (physical or virtually implemented on physical hardware), machines (physical or virtually implemented on physical hardware), end user devices, routers, switches, cable boxes, gateways, bridges, loadbalancers, firewalls, inline service nodes, proxies, processors, modules, or any other suitable device, component, element, proprietary appliance, or object operable to exchange, receive, and transmit information in a network environment. These network elements may include any suitable hardware, software, components, modules, interfaces, or objects that facilitate the disclosed operations. This may be inclusive of appropriate algorithms and communication protocols that allow for the effective exchange of data or information.

In one implementation, components seen in FIG. 1 and other components described herein may include software to achieve (or to foster) the functions discussed herein for serverless computing and task scheduling where the software is executed on one or more processors to carry out the functions. This could include the implementation of instances of an optimizer, provisioner, and/or any other suitable element that would foster the activities discussed herein. Additionally, each of these elements can have an internal structure (e.g., a processor, a memory element, etc.) to facilitate some of the operations described herein. Exemplary internal structure includes elements shown in data processing system in FIG. 9. In other embodiments, these functions for serverless computing and task scheduling may be executed externally to these elements, or included in some other network element to achieve the intended functionality. Alternatively, the components seen in FIG. 1 and other components described herein may include software (or reciprocating software) that can coordinate with other network elements in order to achieve the serverless computing and task scheduling functions described herein. In still other embodiments, one or several devices may include any suitable algorithms, hardware, software, components, modules, interfaces, or objects that facilitate the operations thereof.

In certain example implementations, the functions outlined herein may be implemented by logic encoded in one or more non-transitory, tangible media (e.g., embedded logic provided in an application specific integrated circuit [ASIC], digital signal processor [DSP] instructions, software [potentially inclusive of object code and source code] to be executed by one or more processors, or other similar machine, etc.). In some of these instances, one or more memory elements can store data used for the operations described herein. This includes the memory element being able to store instructions (e.g., software, code, etc.) that are executed to carry out the activities described in this Specification. The memory element is further configured to store information such as task definitions, task queues, rules, dependencies, costs, and capabilities described herein. The processor can execute any type of instructions associated with the data to achieve the operations detailed herein in this Specification. In one example, the processor could transform an element or an article (e.g., data) from one state or thing to another state or thing. In another example, the activities outlined herein may be implemented with fixed logic or programmable logic (e.g., software/computer instructions executed by the processor) and the elements identified herein could be some type of a programmable processor, programmable digital logic (e.g., a field programmable gate array [FPGA], an erasable programmable read only memory (EPROM), an electrically erasable programmable ROM (EEPROM)) or an ASIC that includes digital logic, software, code, electronic instructions, or any suitable combination thereof.

Any of these elements (e.g., the network elements, etc.) can include memory elements for storing information to be used in achieving the optimization functions, as outlined herein. Additionally, each of these devices may include a processor that can execute software or an algorithm to perform the optimization activities as discussed in this Specification. These devices may further keep information in any suitable memory element [random access memory (RAM), ROM, EPROM, EEPROM, ASIC, etc.], software, hardware, or in any other suitable component, device, element, or object where appropriate and based on particular needs. Any of the memory items discussed herein should be construed as being encompassed within the broad term 'memory element.' Similarly, any of the potential processing elements, modules, and machines described in this Specification should be construed as being encompassed within the broad term 'processor.' Each of the network elements can also include suitable interfaces for receiving, transmitting, and/or otherwise communicating data or information in a network environment.

Additionally, it should be noted that with the examples provided above, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that the systems described herein are readily scalable and, further, can accommodate a large number of components, as well as more complicated/sophisticated arrangements and configurations. Accordingly, the examples provided should not limit the scope or inhibit the broad techniques of serverless computing and task scheduling, as potentially applied to a myriad of other architectures.

It is also important to note that the parts of the flow diagram in the FIGS. 2 and 6 illustrate only some of the possible scenarios that may be executed by, or within, the components shown (e.g., in FIGS. 1 and 7) and described herein. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by the components shown and described herein, in that any suitable arrangements, chronologies, configurations, and timing mechanisms may be provided without departing from the teachings of the present disclosure.

The term "system" is used generically herein to describe any number of components, elements, sub-systems, devices, packet switch elements, packet switches, routers, networks, computer and/or communication devices or mechanisms, or combinations of components thereof. The term "computer" is used generically herein to describe any number of computers, including, but not limited to personal computers, embedded processing elements and systems, control logic, ASICs, chips, workstations, mainframes, etc. The term "processing element" is used generically herein to describe any type of processing mechanism or device, such as a processor, ASIC, field programmable gate array, computer, etc. The term "device" is used generically herein to describe any type of mechanism, including a computer or system or component thereof. The terms "task" and "process" are used generically herein to describe any type of running program, including, but not limited to a computer process, task, thread, executing application, operating system, user process, device driver, native code, machine or other language, etc., and can be interactive and/or non-interactive, executing locally and/or remotely, executing in foreground and/or background, executing in the user and/or operating system address spaces, a routine of a library and/or standalone application, and is not limited to any particular memory partitioning technique. The steps, connections, and processing of signals and information illustrated in the FIGURES, including, but not limited to any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process the value—the value must be obtained prior to processing it, although some of the associated processing may be performed prior to, concurrently with, and/or after the read operation). Furthermore, the term "identify" is used generically to describe any manner or mechanism for directly or indirectly ascertaining something, which may include, but is not limited to receiving, retrieving from memory, determining, defining, calculating, generating, etc.

Moreover, the terms "network" and "communications mechanism" are used generically herein to describe one or more networks, communications mediums or communications systems, including, but not limited to the Internet, private or public telephone, cellular, wireless, satellite, cable, local area, metropolitan area and/or wide area networks, a cable, electrical connection, bus, etc., and internal communications mechanisms such as message passing, interprocess communications, shared memory, etc. The term "message" is used generically herein to describe a piece of information which may or may not be, but is typically communicated via one or more communication mechanisms of any type.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

One or more advantages mentioned herein does not in any way suggest that any one of the embodiments necessarily provides all the described advantages or that all the embodiments of the present disclosure necessarily provide any one of the described advantages.

What is claimed is:

1. A method for serverless computing, comprising:
receiving a task definition, wherein the task definition comprises a first task and a second task chained to the first task;
adding the first task and the second task to a task queue;
determining a set of dependency constraints for each task of a task chain in the task queue;
determining a cost and a set of capabilities associated with each serverless computing environment;
executing the first task from the task queue using hardware computing resources in a first serverless environment associated with a first serverless environment provider;
first selecting, based on sets of dependency constraints, the costs, the sets of capabilities, and an output of the first task, a second serverless environment out of a plurality of serverless environments to execute the second task from the task queue; and
executing the second task from the task queue using hardware computing resources in the second serverless environment.

2. The method of claim 1, wherein the task definition comprises a first task identifier identifying the first task, a first pointer to input data, a task action function code, a second pointer to output data, and a second task identifier identifying the second task.

3. The method of claim 1, wherein the first selecting the serverless computing environment comprises minimizing sum of costs for all tasks in the task chain and ensuring the set of dependency constraints for each task in the task chain is satisfied by the set of capabilities associated with the serverless environment selected for each task in the task chain.

4. The method of claim 1, wherein the set of dependency constraints comprises code for the task, and the set of capabilities comprises a programming language that a serverless environment can execute.

5. The method of claim 1, wherein a set of dependency constraints for a given task comprises a data locality compliance rule.

6. The method of claim 1, wherein a set of dependency constraints for a given task comprises one or more requirements specified in a task definition associated with the given task.

7. The method of claim 1, wherein a set of dependency constraints for a given task comprises a rule specifying a particular serverless environment to be used for the given task if a condition of an output of a task previous to the given task in the task chain is met.

8. A system comprising:
- at least one memory element;
- at least one processor coupled to the at least one memory element;
- an interface that when executed by the at least one processor is configured to: receive a task definition, wherein the task definition comprises a first task and a second task chained to the first task and adding the first task and the second task to a task queue; and
- one or more workers provisioned in networked hardware resources of a serverless computing environment that when executed by the at least one processor is configured to:
  - determine a set of dependency constraints for each task of a task chain in the task queue;
  - determine a cost and a set of capabilities associated with each serverless computing environment;
  - execute the first task from the task queue using hardware computing resources in a first serverless environment associated with a first serverless environment provider;
  - first select, based on a sets of dependency constraints, the costs, and the sets of capabilities, and an output of the first task, a second serverless environment out of a plurality of serverless environments to execute the second task from the task queue; and
  - execute the second task from the task queue using hardware computing resources in the second serverless environment.

9. The system of claim 8, wherein the task definition comprises a first task identifier identifying the first task, a first pointer to input data, a task action function code, a second pointer to output data, and a second task identifier identifying the second task.

10. One or more computer-readable non-transitory media comprising one or more instructions, for serverless computing and task scheduling, that when executed on a processor configure the processor to perform one or more operations comprising:
- receiving a task definition, wherein the task definition comprises a first task and a second task chained to the first task;
- adding the first task and the second task to a task queue;
- determining a set of dependency constraints for each task of a task chain in the task queue;
- determining a cost and a set of capabilities associated with each serverless computing environment;
- executing the first task from the task queue using hardware computing resources in a first serverless environment associated with a first serverless environment provider;
- first selecting, based on sets of dependency constraints, the costs, and the sets of capabilities, and an output of the first task, a second serverless environment out of a plurality of serverless environments to execute the second task from the task queue; and
- executing the second task from the task queue using hardware computing resources in the second serverless environment.

11. The media of claim 10, wherein the first selecting the serverless computing environment comprises minimizing sum of costs for all tasks in the task chain and ensuring the set of dependency constraints for each task in the task chain is satisfied by the set of capabilities associated with the serverless environment selected for each task in the task chain.

12. The media of claim 10, wherein the set of dependency constraints comprises the programming language of code for the task, and the set of capabilities comprises a programming language that a serverless environment can execute.

13. The media of claim 10, wherein a set of dependency constraints for a given task comprises one or more of the following: a data locality compliance rule, and one or more requirements specified in a task definition associated with the given task.

14. The media of claim 10, wherein a set of dependency constraints for a given task comprises a rule specifying a particular serverless environment to be used for the given task if a condition of an output of a task previous to the given task in the task chain is met.

* * * * *